United States Patent
Beaujard et al.

(10) Patent No.: US 10,036,277 B2
(45) Date of Patent: Jul. 31, 2018

(54) GAS TURBINE ENGINE COMPRISING A COMPOSITE COMPONENT AND A METAL COMPONENT WHICH ARE CONNECTED BY A FLEXIBLE FIXING DEVICE

(71) Applicant: SNECMA, Paris (FR)

(72) Inventors: Antoine Jean-Philippe Beaujard, Melun (FR); Jacques Rene Bart, Soisy sur Seine (FR)

(73) Assignee: SNECMA, Paris (FR)

(*) Notice: Subject to any disclaimer, the term of this patent is extended or adjusted under 35 U.S.C. 154(b) by 596 days.

(21) Appl. No.: 14/410,180

(22) PCT Filed: Jun. 12, 2013

(86) PCT No.: PCT/FR2013/051378
§ 371 (c)(1),
(2) Date: Dec. 22, 2014

(87) PCT Pub. No.: WO2014/001682
PCT Pub. Date: Jan. 3, 2014

(65) Prior Publication Data
US 2015/0167491 A1      Jun. 18, 2015

(30) Foreign Application Priority Data

Jun. 28, 2012   (FR) ..................... 12 56181

(51) Int. Cl.
*F01D 25/24*   (2006.01)
*F02K 1/04*    (2006.01)
(Continued)

(52) U.S. Cl.
CPC ........... *F01D 25/005* (2013.01); *F01D 25/24* (2013.01); *F01D 25/243* (2013.01); *F02C 7/20* (2013.01);
(Continued)

(58) Field of Classification Search
CPC ..................... F01D 25/005; F05D 2260/30
(Continued)

(56) References Cited

U.S. PATENT DOCUMENTS 3,966,354 A * 6/1976 Patterson ............... F01D 11/18
                                                  415/116
5,249,877 A * 10/1993 Corsmeier ............ F01D 25/246
                                                  403/24
(Continued)

FOREIGN PATENT DOCUMENTS

DE      4343658 A1   7/1994
EP      1391582 A2   2/2004
EP      2246530 A1   11/2010

OTHER PUBLICATIONS

International Search Report dated Sep. 25, 2013 in PCT/FR2013/051378 filed Jun. 12, 2013.

*Primary Examiner* — Dwayne J White
*Assistant Examiner* — Jason Davis
(74) *Attorney, Agent, or Firm* — Oblon, McClelland, Maier & Neustadt, L.L.P.

(57) ABSTRACT

A gas turbine engine for propulsion of an aircraft, the engine extending axially from upstream to downstream and including a composite part, a metal part, and a device for flexible fixing of the parts, the fixing device including: a flexible connecting element including a first fixing portion connected to the metal part by an axial connection and a second fixing portion connected to the composite part by an axial connection, the connecting element including an axially extending free end; and a rigid locking element including a fixing portion connected to the metal part by an axial connection and an axially extending free end, the free end of the locking element being aligned radially with the free end of the (Continued)

connecting element to limit deformation of the connecting element while the engine is in operation.

13 Claims, 2 Drawing Sheets

(51) Int. Cl.
*F02K 1/80* (2006.01)
*F01D 25/00* (2006.01)
*F02C 7/20* (2006.01)

(52) U.S. Cl.
CPC .................. *F02K 1/04* (2013.01); *F02K 1/80* (2013.01); *F05D 2230/642* (2013.01); *Y02T 50/672* (2013.01)

(58) Field of Classification Search
USPC .................................................. 415/134, 135
See application file for complete search history.

(56) References Cited

U.S. PATENT DOCUMENTS

| | | | |
|---|---|---|---|
| 5,445,469 A | 8/1995 | Huck et al. | |
| 6,675,585 B2 * | 1/2004 | Calvez | F23R 3/007 60/753 |
| 8,919,136 B2 * | 12/2014 | Conete | F02K 1/04 60/796 |
| 2004/0036230 A1 * | 2/2004 | Matsuda | F01D 9/023 277/632 |
| 2010/0242494 A1 * | 9/2010 | Mulcaire | F01D 25/24 60/796 |
| 2011/0005234 A1 | 1/2011 | Hashimoto et al. | |

\* cited by examiner

GAS TURBINE ENGINE COMPRISING A COMPOSITE COMPONENT AND A METAL COMPONENT WHICH ARE CONNECTED BY A FLEXIBLE FIXING DEVICE

BACKGROUND OF THE INVENTION

Field of the Invention

The present invention relates to the field of gas turbine engines used for propulsion of an aircraft.

The documents EP-A2-1 391 582, DE-A1-43 43 658 and EP-A1-2 246 530 represent background prior art.

Description of the Related Art

In order to limit the fuel consumption of an aircraft, a solution consists of reducing the mass of the aircraft and of the equipment thereof. To this end, it has been proposed to reduce the mass of gas turbine engines by using components made of composite material in place of components made of metal material.

By way of example, it has been proposed to replace the low-pressure turbine housing of a two-spool turbojet engine by a housing made of ceramic matrix composite material (which may or may not be of the oxide type) known by its abbreviation CMC to the person skilled in the art. A low-pressure turbine housing is conventionally connected to other components of the engine which are metal. The mechanical connection between a CMC housing and a mechanical part has drawbacks because a composite material has a different expansion from a metal material, for example up to four times less. As a result it is necessary to put in place so-called "flexible" mechanical connections between a composite part and a metal part in order to avoid stressing the composite part excessively due to the differential expansions. Nevertheless, it is necessary that the flexible connection be sufficiently rigid to transmit the forces between the components and to avoid a deterioration of the dynamic response of the connected components.

As illustrated in FIG. 1, the patent application FR2935753 A1 in the name of Snecma Propulsion Solide discloses a flexible connection 90 between an annular part 20 made of metal material rigidly connected to the aeronautical engine and an afterbody part made of ceramic matrix composite material 30 having a rotational shape at least in its upstream portion. The flexible connection 90 has a first end 91 fixed on the metal part 20 by an axial screw A1 and a second end 92 fixed on the upstream portion of the afterbody part made of composite material 30 by a radial screw A2.

This type of flexible connection 90 is not suitable for large engines of considerable mass since it necessitates the use of radial screws A2—in order to connect the second end 92 of the flexible connection 90 to the upstream portion of the afterbody part 30—which are subject to high shear for this type of engine which limits their service life. A solution for overcoming this drawback would be to increase the size of the radial screws A2 but this would increase the mass thereof which is contrary to the objective sought. Furthermore, the radial screws A2 may have drawbacks for the transmission of axial forces and also for the sealing between the two components 20, 30. In addition, the flexible connection 90 illustrated in FIG. 1 is not suitable for ensuring the mechanical strength of highly stressed components such as a turbine housing or an exhaust case because of their low rigidity. Finally, such a connection might be damaged if a fragment of blade becomes detached.

BRIEF SUMMARY OF THE INVENTION

In order to eliminate at least some of these drawbacks, the invention relates to a gas turbine engine for propulsion of an aircraft, said engine extending axially from upstream to downstream and comprising a composite part, a metal part and a device for flexible fixing of said parts, said fixing device comprising:

a flexible connecting element comprising a first fixing portion connected to the metal part by an axial connection and a second fixing portion connected to the composite part by an axial connection, said connecting element comprising an axially extending free end; and a rigid locking element comprising a fixing portion connected to the metal part by an axial connection and an axially extending free end, the free end of the locking element being aligned radially with the free end of the connecting element so as to limit the deformation of the connecting element while the engine is in operation.

The fixing device is connected via axial connections in order to improve the transmission of forces between the composite part and the metal part. An axial connection has a longer service life than a radial connection which is subject to shear.

The fixing device makes it possible, on the one hand, to provide flexibility by means of its flexible connecting element, which is advantageous in order to compensate for differential expansion during operation and, on the other hand, to provide rigidity by means of its locking element which limits any excessive distortion of the connecting element and protects the connection.

The fixing device according to the invention is also sufficiently rigid to permit the transmission of structural forces between the composite part and the metal part.

The free end of the locking element is preferably radially outside the free end of the connecting element. Thus, the free end of the locking element is brought into contact with the free end of the connecting element when the connecting element is excessively deformed.

The flexible connecting element preferably comprises an intermediate portion connecting the first fixing portion to the second fixing portion, said intermediate portion comprising through-holes so as to give flexibility to the connecting element.

The intermediate portion of the flexible connecting element preferably extends axially. Thus, any inclination of one of the ends of the connecting element is eliminated by the flexibility of its intermediate portion which extends axially.

According to an aspect of the invention, the fixing device comprises a sealing element mounted between the connecting element and the locking element. The sealing element makes it possible to avoid any leakage of energetic airflow outside the engine, in particular through the through-holes in the connecting element. The sealing element is preferably in the form of a curved sheet of metal.

The connecting element and the locking element are preferably connected to the metal part by the same axial connection. Thus, the fixing device can be mounted quickly on the engine.

According to a preferred aspect of the invention, the radially inner portion of the fixing device is thick by comparison with its radially outer portion so as to retain any debris from the engine. In fact, if a fragment of blade becomes detached, this fragment moves radially in the engine but does not damage the connection which is protected by the radially inner portion of the fixing device which is thick. In this example, the elements facing the blades, that is to say, the free end of the connecting element and the locking element, are made thicker. The fixing device advantageously provides, on the one hand, great flexibility to make it possible to compensate for differential expansion during operation and, on the other hand, great rigidity to allow a fragment of turbine blade to be retained in the event of malfunction.

The locking element is preferably thicker than the connecting element. Thus, the rigid locking element can protect the connecting element which is thin in order to provide more flexibility.

This is particularly advantageous in order to protect the connecting element in the event of loss of a fragment of blade.

More preferably, the free end of the connecting element is thicker than the fixing portions thereof. Thus, this makes it possible to protect the flexible portion of the connecting element as well as the axial connection to the composite part. Preferably, the portion of the free end of the connecting element which is facing the free end of the locking element is less thick than the portion which is not facing in order to limit the mass of the device. If a blade fragment is lost in the region of the portion of the free end of the connecting element that faces the free end of the locking element, the connection is protected by a thickness of the locking element and a thickness of the connecting element.

According to a preferred aspect of the invention, the metal part is a turbine housing of a turbojet engine and the composite part is an exhaust case of a turbojet engine. The exhaust case is preferably made of CMC material.

BRIEF DESCRIPTION OF THE SEVERAL VIEWS OF THE DRAWINGS

The invention will be better understood on reading the following description given solely by way of example and with reference to the accompanying drawings, in which.

DETAILED DESCRIPTION OF THE INVENTION

It should be noted that the drawings disclose the invention in a detailed manner in order to carry out the invention, but said drawings can of course serve to better define the invention where appropriate.

The invention will be presented for a turbojet engine for propulsion of an aircraft but of course the invention applies to any gas turbine engine for propulsion of an aircraft.

In this example, the turbojet engine comprises a low-pressure turbine housing made of metal material and an exhaust case made of composite material which are connected by a fixing device according to the invention; Of course the invention can apply to the connection of another metal part to another composite part of the turbojet engine.

Figure 1:
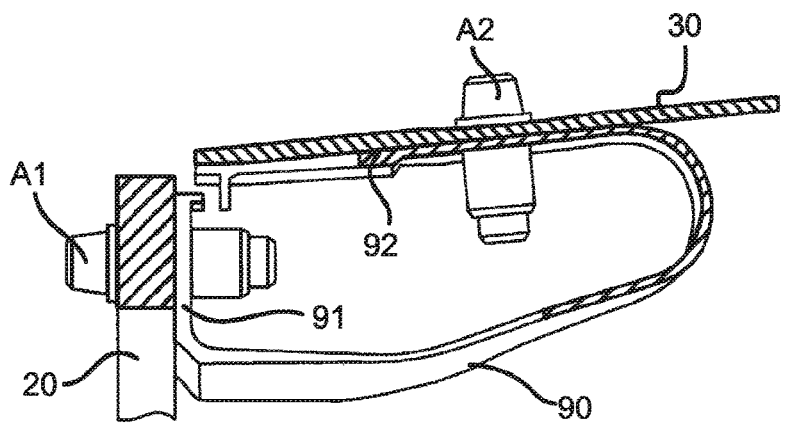
FIG. 1 is a sectional view of a flexible connection according to the prior art (already mentioned)
Figure 2:
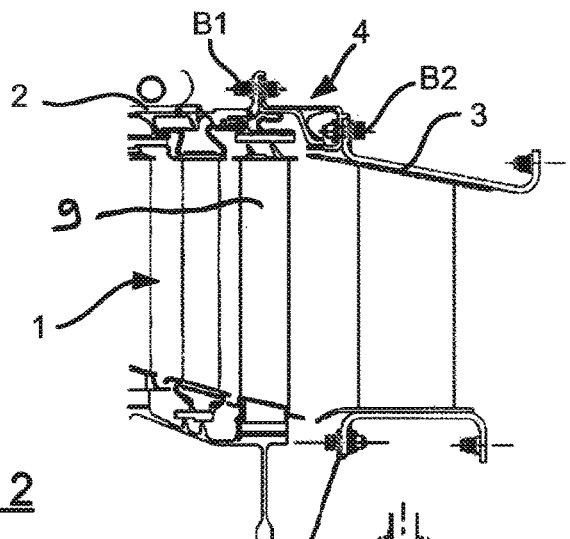
FIG. 2 is a sectional view of a turbojet engine of which the metal turbine housing and the exhaust case made of composite material are connected by a flexible fixing device according to the invention.
Figure 2:
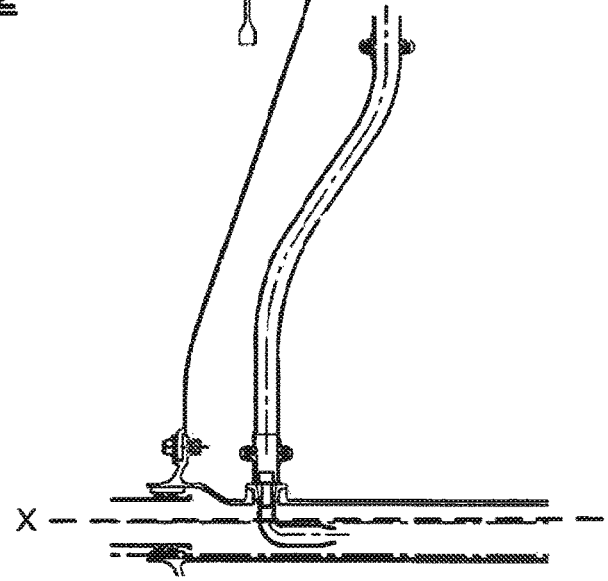
Figure 3:
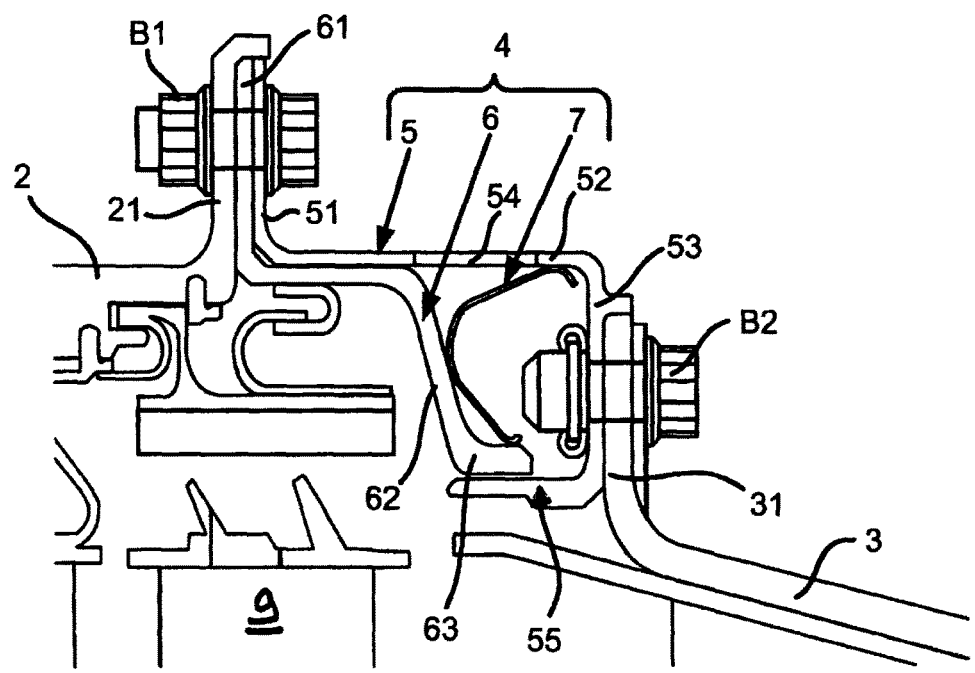
FIG. 3 is a close-up view of the flexible fixing device of FIG. 2.

As shown in FIG. 2, a two-spool turbojet engine extends axially, from upstream to downstream, along an axis X and comprises an axial low-pressure turbine housing 2 made of metal material connected to an axial exhaust case 3 made of composite material by a fixing device 4. The axial low-pressure turbine housing 2 is an annular part extending axially along the axis X and is radially outside the low-pressure body 1 of the two-spool turbojet engine. With reference to FIG. 2, the low-pressure body 1 comprises a low-pressure shaft on which radial blades 9 are mounted. The low-pressure turbine housing 2 is a structural part which advantageously makes it possible to take up the thrust generated by the turbojet engine in order to transmit it to the aircraft on which the turbojet engine is mounted. The low-pressure turbine housing 2 is made of heat-resistant austenitic metal alloy and terminates at its downstream end in a fixing flange 21 as illustrated in FIG. 3. The downstream fixing flange 21 extends radially and comprises a plurality of openings distributed at its circumference to allow an axial connection B1 to the fixing device 4 as will be described in detail below.

The axial exhaust case 3—which is also annular—is mounted downstream of the low-pressure turbine housing 2 and makes it possible to guide the exhaust gases coming from the combustion chamber of the turbojet engine situated upstream of the high-pressure turbine. In order to reduce its mass, the exhaust case 3 is made of composite material. In this example, the exhaust case 3 is made of ceramic matrix composite material known by the abbreviation CMC to the person skilled in the art. As shown in FIG. 3, the exhaust case 3 comprises at its upstream end a fixing flange 31 which extends radially and which comprises a plurality of openings distributed at its circumference to allow an axial connection B2 to the fixing device 4 as will be described in detail below.

As illustrated in FIGS. 2 and 3, the low-pressure turbine housing 2 and the exhaust case 3 are connected by a flexible fixing device 4 according to the invention so as to compensate for the differential expansion between said housings 2, 3. With reference to FIG. 3, the flexible fixing device 4 comprises a flexible annular connection element 5 and a rigid annular locking element 6.

Flexible Connecting Element 5

In this example, the connecting element 5 of the flexible fixing device 4 is in the form of an integral metal part, preferably, made of a nickel-based heat-resistant austenitic metal alloy.

As illustrated in FIG. 3, the connecting element 5 comprises, from upstream to downstream, an upstream portion 51 for fixing to the low-pressure turbine housing 2, an intermediate portion 52 and a downstream portion 53 for fixing to the exhaust case 3. The upstream fixing portion 21 is in the form of a fixing flange which extends radially and which comprises a plurality of openings distributed at its circumference to allow an axial connection B1 to the fixing flange 21 of the low-pressure turbine housing 2. In other words, the connecting element 5 has an L shape upstream.

The intermediate portion 52 of the connecting element 5 extends axially between the fixing portions 51, 53 and comprises through-holes 54 distributed at its circumference so as to give flexibility to the connecting element 5. In this example the connecting element 5 comprises a plurality of through-holes 54 with a diameter of approximately 500 mm but of course the number and the dimensions of the holes 54 can vary in order to provide the desired flexibility to the connecting element 5. Of course, the intermediate portion 52 of the connecting element 5 could also have another shape. The intermediate portion 52 of the connecting element 5 preferably has a thickness of approximately 1-2 mm in order to provide flexibility.

Figure 4:
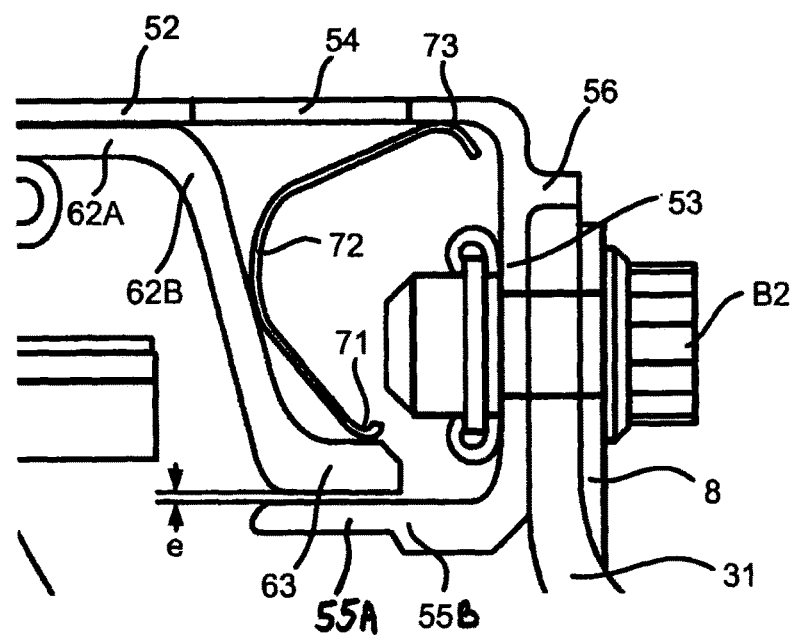
FIG. 4 is a close-up view of the upstream portion of the fixing device of FIG. 2.

The downstream fixing portion 53 of the connecting element 5 extends radially and comprises a plurality of openings distributed at its circumference to allow an axial connection B2 to the fixing flange 31 of the exhaust case 3. The downstream fixing portion 53 terminates in a free end 55 which extends axially from downstream to upstream from the radially lower end of the downstream fixing portion 53 as shown in FIGS. 3 and 4. Thus the free end 55 is radially lower than the intermediate portion 52 of the connecting element 5. In other words, the connecting element 5 has, downstream, a U shape of which the base of the U extends radially and of which the arms of the U extend axially as illustrated in FIGS. 3 and 4. Thus the connecting element 5 has the overall shape of a "squirrel cage" because of its circular nature and the presence of radial through-holes 54.

The free end 55 of the connecting element 5 is thicker than the intermediate portion 52 of the connecting element 5 so as to form a protection for the fixing device 4 in the event of the loss of a fragment of a blade 9 of the turbojet engine.

In this example, with reference to FIG. 4, the portion 55A of the free end of the connecting element 5 which is facing the free end 63 of the locking element 6 is less thick than the portion 55B which is not facing in order to limit the mass of the device. In fact, if a blade fragment is lost in the region of the portion 55A that faces the free end 63 of the locking element 6, the connection is protected by a thickness of the locking element 6 and a thickness of the connecting element 5, which provides sufficient protection whilst limiting the mass. Preferably, the portion 55B of the connecting element 5 has a thickness of approximately 5 mm whilst the portion 55A of the connecting element 5 has a thickness of approximately 2 mm.

Rigid Locking Element 6

Still with reference to FIG. 3, the locking element 6 of the fixing device 4 comprises, from upstream to downstream, an upstream portion 61 for fixing to the low-pressure turbine housing 2, an intermediate portion 62 and a free portion 63 (also designated as the free end 63). The upstream fixing portion 61 is in the form of a fixing flange which extends radially and which comprises a plurality of openings distributed at its circumference to allow an axial connection B1 to the fixing flange 21 of the low-pressure turbine housing 2 and the fixing flange 51 of the connecting element 5 as will be described in detail below. The intermediate portion 62 of the locking element 6 extends overall obliquely between the fixing portion 61 and the free end 63 of the locking element 6 so that the free end 63, which extends axially, is situated between the intermediate portion 52 of the connecting element 5 and its free end 55, as shown in FIG. 3. The intermediate portion 62 of the locking element 6 preferably comprises an axial upstream portion 62A and an oblique downstream portion 62B as shown in FIG. 4. Thus, the oblique downstream portion 62B advantageously ensures that the locking element 6 is not in contact with the through-holes 54 of the connecting element 5 which provide flexibility to the connecting element 5.

The free end 63 of the locking element 6 preferably extends over its entire length between the intermediate portion 52 of the connecting element 5 and its free end 55, as shown in FIG. 4. Preferably, with reference to FIG. 4, the radial space "e" between the free ends 55, 63 of the fixing device 4 is of approximately a few millimeters so as to limit the circulation of air from the interior to the exterior of the turbojet engine.

The free ends 55, 63 of the fixing device 4 form abutment means in the case of a malfunction known to the person skilled in the art by the abbreviation FBO for "fan blade off". In this type of malfunction the exhaust case 3 is mechanically stressed in directions that are transverse to the axis of the engine. The free end 55 of the connecting element 5 is advantageously in radial abutment with the free end 63 of the locking element 6 in order to limit the amplitude of the stresses. The structural properties of the fixing device 4 are therefore reinforced.

The locking element 6 is thicker than the intermediate portion 52 of the connecting element 5 so as to form a protection for the connecting element 5 by retaining fragments of the blades 9 closest to the flexible connection. In fact, as illustrated in FIG. 3, the flexible intermediate portion 52 of the connecting element 5 is protected by the locking element 6, thus avoiding any damage in the event of impact with a fragment of blade 9. The locking element 6 preferably has a thickness of approximately 5 mm.

Sealing Element 7

Preferably, with reference to FIGS. 3 and 4, the fixing device 4 comprises a sealing element 7 mounted between the connecting element 5 and the locking element 6 suitable for closing the annular space between said elements 5, 6. In other words, the sealing element 7 makes it possible to prevent the circulation towards the exterior of the turbojet engine of an energetic airflow circulating inside the housings 2, 3. Defective sealing leads to a loss of the propulsive efficiency of the aircraft, which is disadvantageous.

As the intermediate portion 52 of the connecting element 5 comprises through-holes 54 suitable for allowing the circulation towards the exterior of an energetic airflow, the sealing element 7 makes it possible to prevent this circulation and avoid any loss of thrust. As illustrated in detail in FIG. 4, the sealing element 7 is in the form of an annular curved metal sheet, preferably V-shaped and made of a cobalt/nickel-based heat-resistant metal alloy of which the opening is turned upstream. The sealing element 7 has a curvilinear body 72 of which a first end 71 is in contact with the external surface of the free end 63 of the locking element 6 and of which a second end 73 is in contact with the internal surface of the intermediate portion 52 of the connecting element 5, preferably, upstream of the through-holes 54 as illustrated in FIG. 4. The sealing element 7 preferably rests on two distinct zones of contact with the locking element (intermediate portion 62 and free end 63). The sealing element 7 is preferably configured to deform depending on the speed of the turbojet engine so that its optimal closing shape is obtained at cruising speed, an energetic airflow—circulating across the radial space "e" between the free ends 55, 63 of the fixing device 4—deforming the sealing element 7.

The sealing element 7 has a lower mass and allows any loss of thrust to be avoided without impairing the flexibility of the fixing device 4, which is advantageous.

The fixing device 4 is simple to fit between the low-pressure turbine housing 2 and the exhaust case 3, since upstream the fixing flanges 21, 61, 51 of the low-pressure turbine housing 2, the locking element 6 and the connecting element 5 are connected by the same axial connection B1, in this case a bolted connection B1, and downstream the fixing flanges 53, 31 of the connecting element 5 and of the exhaust case 3 are connected by an axial connection B2, in this case a bolted connection B2. Mounting the fixing device 4 is fast and robust, an axial connection B1, B2 making it possible to transmit axial forces without risk of shear unlike a radial connection. The sealing element 7 is preferably mounted between the connecting element 5 and the locking element 6 prior to both elements being mounted on the housings 2, 3 of the turboreactor.

In operation, the low-pressure turbine housing 2, made of metal, expands more than the exhaust case 3, which induces a deformation of the fixing device 4 of which the upstream portion is straightened. Because of the flexibility of the connecting element 5 of the fixing device 4, the differential expansion is absorbed by the fixing device 4. In the event of considerable distortion, for example the loss of a fan blade, the deformation of the fixing device 4 may be very considerable. The presence of abutment means limits this deformation, allowing the forces received by the connecting element 5 to be transmitted to the locking element 6 when the free end 63 of the locking element 6 is in contact with the connecting element 5. Furthermore, the thickness of the locking element 6 and of the free end 55 of the connecting element 5 allows the fixing device 4 to be protected in the event of impact with a fragment of blade. Finally, the sealing element 7 has an optimal shape during the operation of the turbojet engine to prevent any leakage of high-energy air, in particular through the through-holes in the connecting element 5. This makes it possible to preserve optimal output of the turbojet engine.

A metal upstream part and a downstream part made of composite material have been described, but of course the invention applies to any arrangement of parts, in particular an upstream part made of composite material and a metal downstream part.

The invention claimed is:

1. A gas turbine engine for propulsion of an aircraft, the engine extending axially from upstream to downstream and comprising:
   a composite part;
   a metal part; and
   a fixing device for flexible fixing of the metal part and the composite part to one another, the fixing device comprising:
      a flexible connecting element comprising a first fixing portion connected to the metal part by a first axial connection and a second fixing portion connected to the composite part by a second axial connection, the flexible connecting element comprising an axially extending free end; and
      a rigid locking element comprising a fixing portion connected to the metal part by an axial connection and an axially extending free end, the free end of the rigid locking element being aligned radially with the free end of the flexible connecting element, the free end of the rigid locking element forming abutment means of the free end of the flexible connecting element in event of radial deformation of the flexible connecting element while the engine is in operation,
   wherein the first fixing portion of the flexible connecting element and the second fixing portion of the flexible connecting element are axially offset, and the free end of the flexible connecting element is located axially between the first fixing portion of the flexible connecting element and the second fixing portion of the flexible connecting element.

2. An engine according to claim 1, wherein the free end of the rigid locking element is radially outside the free end of the flexible connecting element.

3. An engine according to claim 1, wherein the flexible connecting element comprises an intermediate portion connecting the first fixing portion to the second fixing portion, the intermediate portion comprising through-holes to give flexibility to the flexible connecting element.

4. An engine according to claim 3, wherein the intermediate portion of the flexible connecting element extends axially.

5. An engine according to claim 1, wherein the fixing device comprises a sealing element mounted between the flexible connecting element and the rigid locking element.

6. An engine according to claim 5, wherein the sealing element is in a form of a curved metal sheet.

7. An engine according to claim 1, wherein the flexible connecting element and the rigid locking element are connected to the metal part by a same axial connection.

8. An engine according to claim 1, wherein a radially inner portion of the fixing device is thicker by comparison with a radially outer portion of the fixing device to be able to retain any debris from the engine.

9. An engine according to claim 1, wherein the rigid locking element is thicker than the flexible connecting element.

10. An engine according to claim 1, wherein the free end of the flexible connecting element is thicker than the first and second fixing portions of the flexible connecting element.

11. An engine according to claim 1, wherein the metal part is a turbine housing of a turbojet engine and the composite part is an exhaust case of the turbojet engine.

12. An engine according to claim 1, wherein the first fixing portion of the flexible connecting element is upstream of the second fixing portion of the flexible connecting element, and the free end of the flexible connecting element is downstream of the first fixing portion of the flexible connecting element and is upstream of the second fixing portion of the flexible connecting element.

13. A gas turbine engine for propulsion of an aircraft, said engine extending axially from upstream to downstream and comprising:
   a composite part;
   a metal part; and
   a fixing device for flexible fixing of said metal part and said composite part to one another, said fixing device comprising:
      a flexible connecting element comprising a first fixing portion connected to the metal part by a first axial connection and a second fixing portion connected to the composite part by a second axial connection, said flexible connecting element comprising an axially extending free end; and
      a rigid locking element comprising a fixing portion connected to the metal part by an axial connection and an axially extending free end, the free end of the locking element being aligned radially with the free end of the flexible connecting element, the free end of the rigid locking element forming abutment means of the free end of the flexible connecting element in the event of radial deformation of the connecting element while the engine is in operation,
   wherein the free end of the rigid locking element is radially outside the free end of the flexible connecting element.

* * * * *